(12) United States Patent
Vincent et al.

(10) Patent No.: US 6,744,549 B2
(45) Date of Patent: Jun. 1, 2004

(54) ELECTROCHROMIC DISPLAY DEVICE

(75) Inventors: John B. Vincent, Midland, MI (US);
Derrick W. Flick, Midland, MI (US)

(73) Assignee: Dow Global Technologies Inc., Midland, MI (US)

( * ) Notice: Subject to any disclaimer, the term of this patent is extended or adjusted under 35 U.S.C. 154(b) by 162 days.

(21) Appl. No.: 10/102,535

(22) Filed: Mar. 19, 2002

(65) Prior Publication Data

US 2003/0179432 A1 Sep. 25, 2003

(51) Int. Cl.[7] .............................................. G02F 1/153
(52) U.S. Cl. .................... 359/269; 359/268; 359/273; 359/274
(58) Field of Search ................................ 359/266, 268, 359/269, 270, 273, 274

(56) References Cited

U.S. PATENT DOCUMENTS

| | | | |
|---|---|---|---|
| 3,280,701 A | 10/1966 | Donnelly et al. | 359/267 |
| 3,806,229 A | 4/1974 | School et al. | 359/273 |
| 3,827,784 A | 8/1974 | Giglia et al. | 359/271 |
| 4,129,861 A | 12/1978 | Giglia | 359/275 |
| 4,175,838 A | 11/1979 | Randin | 359/270 |
| 4,349,818 A | 9/1982 | Kaneko et al. | 340/785 |
| 4,488,781 A | 12/1984 | Giglia | 359/271 |
| 4,550,982 A | 11/1985 | Hirai | 359/274 |
| 4,712,879 A | 12/1987 | Lynam et al. | 359/275 |
| 4,810,067 A | 3/1989 | Demiryont | 359/265 |
| 5,189,549 A | 2/1993 | Leventis et al. | 359/271 |
| 5,225,582 A | 7/1993 | Mason | 556/423 |
| 5,413,739 A | 5/1995 | Coleman | 252/511 |
| 5,444,330 A | 8/1995 | Leventis et al. | 313/506 |
| 5,457,564 A | 10/1995 | Leventis et al. | 359/271 |
| 5,545,291 A | 8/1996 | Smith et al. | 438/107 |
| 5,561,206 A | 10/1996 | Yamamoto et al. | 526/256 |
| 5,679,283 A | 10/1997 | Tonar et al. | 252/583 |
| 5,708,123 A | 1/1998 | Johannsen et al. | 528/229 |
| 5,818,636 A | 10/1998 | Leventis et al. | 359/273 |
| 5,852,509 A | 12/1998 | Coleman | 359/271 |
| 5,877,888 A | * 3/1999 | Coleman | 359/267 |
| 6,136,468 A | 10/2000 | Mitchell, Jr. et al. | 429/110 |
| 6,183,878 B1 | 2/2001 | Berneth et al. | 429/300 |
| 6,232,019 B1 | 5/2001 | Wunder et al. | 429/300 |
| 6,241,916 B1 | 6/2001 | Claussen et al. | 252/583 |
| 6,248,263 B1 | 6/2001 | Tonar et al. | 252/583 |
| 6,266,177 B1 | 7/2001 | Allemand et al. | 359/265 |
| 6,277,307 B1 | 8/2001 | Berneth et al. | 252/583 |

(List continued on next page.)

FOREIGN PATENT DOCUMENTS

| | | | | |
|---|---|---|---|---|
| EP | 796510 B1 | 4/1999 | | |
| EP | 1043621 A1 | 10/2000 | | |
| JP | 1134429 | 5/1989 | | |
| WO | WO 95/13600 | * 5/1995 | | G09F/9/30 |
| WO | WO 98/13724 | * 4/1998 | | G02F/1/155 |
| WO | WO 02/075442 | 9/2002 | | G02F/1/155 |

OTHER PUBLICATIONS

"Electrochromic Display Device and Compositions Useful in Making Such Device" filed in the United States of America on Mar. 19, 2002; Application Ser. No.: 10/102238.

(List continued on next page.)

Primary Examiner—Georgia Epps
Assistant Examiner—David N. Spector

(57) ABSTRACT

The invention is a display device comprising a solid top transparent, charge conducting material, positioned below the transparent solid material is an active layer comprising an electrochromic material and an electrolyte, and positioned below the active layer is a working electrode and a counter-electrode arranged to be isolated from one another, wherein the distance between the working and the counter electrode is greater than two times the thickness of the active layer between the electrode and the conductive material.

22 Claims, 1 Drawing Sheet

U.S. PATENT DOCUMENTS

| | | | |
|---|---|---|---|
| 6,288,825 B1 | 9/2001 | Byker et al. | 359/265 |
| 6,294,111 B1 | 9/2001 | Shacklett, III et al. | 252/518.1 |
| 6,302,986 B1 | 10/2001 | Toya et al. | 156/109 |
| 6,327,069 B1 | 12/2001 | Allemand et al. | 359/365 |
| 2002/0005977 A1 | 1/2002 | Guar et al. | 359/285 |
| 2002/0171081 A1 * | 11/2002 | Vincent et al. | 257/40 |
| 2002/0171907 A1 * | 11/2002 | Vincent et al. | 259/271 |
| 2003/0179432 A1 * | 9/2003 | Vincent et al. | 359/265 |

OTHER PUBLICATIONS

"Thermal and Optical Behavior of Electrochromic Windows Fabricated with Carbon–Based Counterelectrode"; Electrochemical Acta., 44 (1999) 3211–3217;Nishikitani, Y., et al.

"Electrochromic Display Device and Compositions Useful in Making such Device" filed in the United States of America on Mar. 19, 2001; Application Ser. No.: 60/277,030.

"Matrix Addressable Electrochromic Display Device" filed in the United States of America on Mar. 19, 2002: Application Ser. No. 10/102,491.

Coleman, et al., "Printed, flexible electrochromic displays using interdigitated electrodes", Solar Energy Materials & Solar Cells 56 (1999) 395–418.

M. Brandon and B.P. Piggin, "Front Face Electrochromic Display", IBM Technical Disclosure Bulletin, vol. 21, No. 5, Oct. 1978, 2047.

* cited by examiner

ELECTROCHROMIC DISPLAY DEVICE

FIELD OF INVENTION

This invention relates to electrochromic display devices.

BACKGROUND OF THE INVENTION

Traditionally, electrochromic display devices have been in a "sandwich" configuration. Sandwich devices use vertically arranged electrodes with at least one transparent electrode at the viewable surface of the device. In light of difficulties such as low conductivity, difficulty of manufacture, and potential corrosion especially in aqueous systems, devices have been developed which are not configured in a sandwich arrangement. Such devices do not require transparent electrodes at the viewable surface. Instead of a transparent electrode at the viewable surfaces, these devices have a gelled electrolyte at the viewable surface. The electrodes are not vertically arranged. Rather, they are present in a same plane.

In electrochromic devices using the side-by-side or interidigitated in plane configured electrodes, an ionically conductive transparent gelled electrolytic layer is placed on top of the electrochromic layer under a transparent polyester or polyimide film. To activate the electrochromic layer, interdigitated or side-by-side counter and working electrodes are printed on a bottom substrate. Because a high conductivity gelled electrolyte is used, the resistivity of the electrolyte is much less than the resistivity of the electrochromic layer. This concept has been extended to the use of a gelled visible layer containing an electrolyte to include a double-sided electrochromic display. Like side-by-side systems, the double-sided device does not require a transparent electrically conductive electrode at the viewable surface.

Nonetheless, gelled aqueous electrolytes present a water barrier problem for devices fabricated on plastic films, such as PET. Typically, PET and other plastic films are poor water vapor barriers. Water loss can significantly impact the lifetime and reliability of the device.

SUMMARY OF THE INVENTION

Applicants have invented new electrochromic devices where interdigitated drive architecture can be used while the undesirable aspects of using aqueous electrolytes or gelled aqueous electrolytes can be avoided.

According to a first embodiment the invention is a display device comprising a solid transparent, charge conducting material, positioned below the transparent solid material, an active layer comprising an electrochromic material and an electrolyte; and positioned below the active layer a working electrode and a counter-electrode arranged such that they are isolated from one another, wherein the distance between the working and the counter electrode is greater than two times the thickness of the active layer between the electrode and the transparent conductive material.

According to a second embodiment the invention is a display device comprising a transparent, charge conducting material and below the transparent material is an active layer comprising compound (a) a non-aqueous compound that undergoes an electron transfer reaction with a subsequent change in its protic state resulting in a pH gradient in the device, (b) at least one indicator dye, and (c) a charge transport material, and positioned below the active layer a working electrode and a counter electrode arranged such that they are isolated from one another, wherein the distance between the working layer and the counter electrode is greater than two times the thickness of the active layer between the electrode and the transparent conductive material.

According to a third embodiment the invention is a display device comprising a transparent conducting material, and below the transparent material is an active layer comprising (a) a compound that undergoes an electron transfer reaction with subsequent change in its protic state, (b) at least one indicator dye which changes color when a change in pH occurs, and (c) an ionically conductive material and optionally component (d), a matrix material, wherein components (a), (b), (c) and (d) are different from one another and component (a) preferentially undergoes the electron transfer reaction when a charge is applied to the composition and positioned below the active layer a working electrode and a counter electrode such that they are arranged isolated from one another, where in the distance between the working layer and the counter electrode is greater than two times the thickness of the active layer between the electrode and the transparent conductive material.

DETAILED DESCRIPTION

Figure 1:
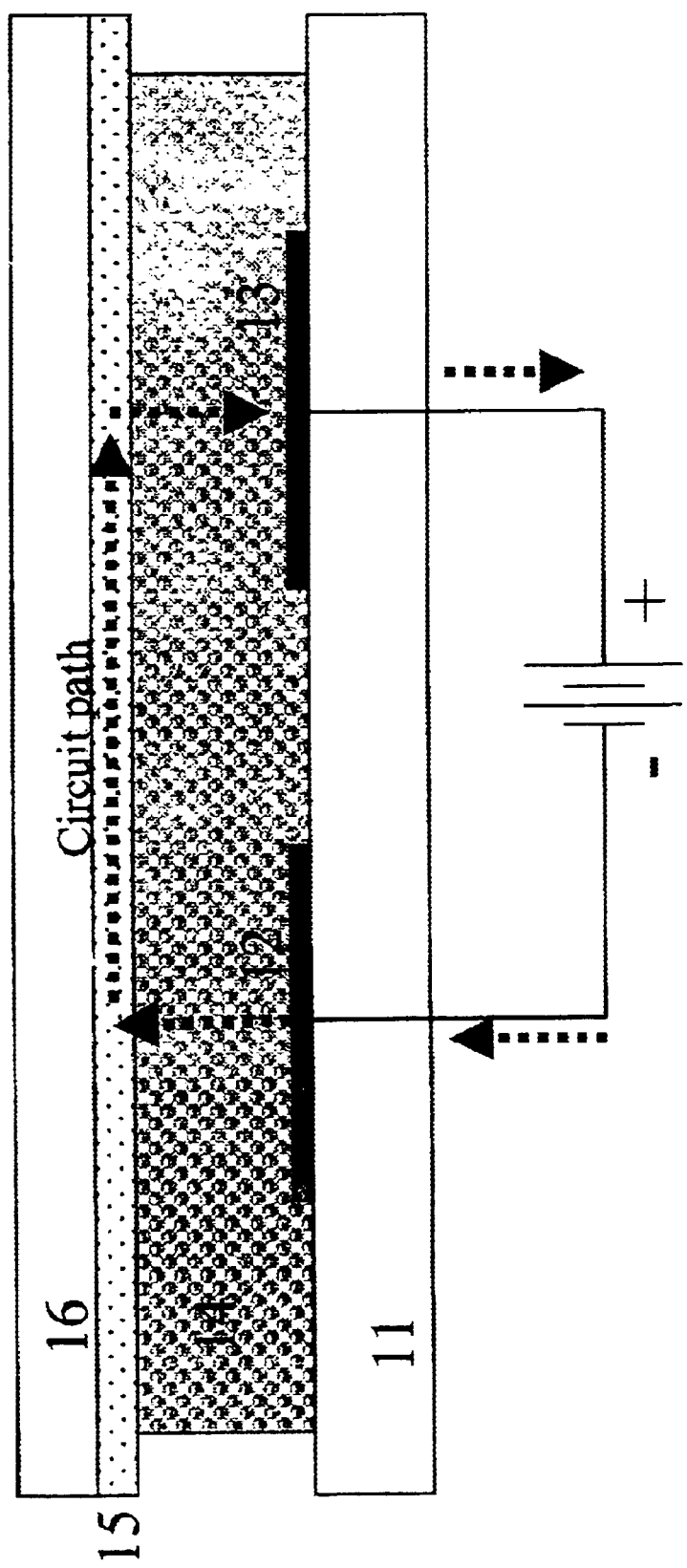
FIG. 1 (not to scale) represents a cross-section of a non-limiting embodiment of the present invention.

An electrochromic material is defined as any material or group of materials that can undergo a visible color change upon application of an electric field.

An electrolyte is defined as any material that conducts ions, i.e. is ionically conductive.

As used herein, an "active layer" consists of an electrochromic material mixed with an electrolyte or an electrochromic material. The active layer is ionically conductive.

A pixel is defined as the smallest addressable unit of a display device.

Referring to FIG. 1, the bottom support layer 11, may be any known surface such as glass, plastic, wood, or metal which may or may not be transparent. The optional top support layer 16, may be any known transparent surface such as plastic sheet, film, or glass. When an electric field is applied between electrodes 12 and 13, ions flow through the active layer 14. If the conductivity of the active layer 14 were much greater than the conductivity of the top transparent electrode 15, it would be expected that current would take the path of least resistance and flow directly between the electrodes 12 and 13. However, if the conductivity of the transparent charge conducting layer 15, is much greater than the conductivity of the active layer 14, the circuit will be completed by the current flowing from electrode 12, through the active layer 14 to the transparent top 15, and along material 15, down through one active layer 14, and then down to the second electrode, 13 (i.e. taking the path of least resistance). The electrical conductivity of 12 and 13 are adequate to supply current to the device and the polarity of the two are interchangeable in order to reverse the electrochemical reaction). The required distance between Elements 12 and 13 is greater than two times the thickness of Element 14 between the electrode and the transparent conductive material to prevent current flow from occurring directly between 12 and 13 exclusively.

The electrodes may be any conducting material which may or may not be transparent including: metals, metal oxides, metal, or metal oxide-filled polymers such as tin oxide, antimony-tin oxide, indium-tin oxide, silver, graphite, and conductive filled polymers, or other conductive inks. Inks and/or polymer systems could, be printed or applied using traditional methods such as blade coating, stenciling, spin coating, etc., or could be applied as a pattern via conventional drum printing, screen printing, or ink jet printing. A combination of materials may also be used to enhance current distribution. For example, a ring of a more conductive metal or other highly conductive material may surround the electrode in order to improve current distribution across the electrode surface. In addition, layering of different conducting materials may be used to optimize conductivity and limit reactivity and/or galvanic activity. It is preferred that the layer in contact with electrochromic materials be inert (i.e. materials such as graphite or carbon, properly doped metal oxides, or noble metals such as gold or platinum). An insulator may or may not be present between the two electrodes.

Either oxidation or reduction occurs at least at the interface between 14 and 15 in the region directly above the first electrode 12. On the other hand, the opposite reaction, reduction or oxidation, occurs in the region at the interface between 14 and 15 directly above the second electrode 13. Depending upon whether or not the electrochromic material is cathodically or anodically colored, coloration will occur either at one region directly above 12 and 13. If the electrochromic material is both cathodically and anodically colored, coloration will occur directly above each respective electrode.

The top substrate material, 15, must be transparent because the display image created by the electrochromic color change is viewed through it. Examples of transparent conductors that could be used as 15 include indium tin oxide (ITO), tin oxide, antimony tin oxide (ATO), or any other transparent metal oxide, as well as thin transparent films of metals or metal alloys such as gold, chrome, or platinum (either of which may optionally be coated with a protective barrier, such as titanium dioxide or derivative, silicon dioxide or derivatives or any conductive polymers and their derivatives, including but not limited to: poly(3,4-ethylenedioxythiophene) (PEDOT), polyaniline, polythiophene, polypyrrole, and polyphenylenevinylene (PPV). A transparent conducting polymer could also be used alone as the electrode, as long as the resistivity is low enough to provide adequate current flow. Transparent metal and metal oxide filled polymers such as indium tin oxide and antimony tin oxide, filled into a curable polymer such as a polyacrylate or polyurethane may be employed as well. According to the second and third embodiments, gelled electrolytes and the like could be used as well but are less preferred.

The solid transparent conductive material as discussed above frequently have resistivities on the order of 10 to 3000 Ohms per square. In the architectures described here, it is required that the electrochromic ionically conductive active layer, 14, must have a conductivity less than the conductivity of the electrically conductive top transparent material 15. If 14 is transparent then the rear electrodes, 12 and 13, can be of the same material 15 in order to make the entire cell transparent; however, if 14 is not optically transparent then a different material, such an opaque printed ink may be used. While in FIG. 1 the electrodes 12 and 13 are shown as being separated by the active layer 14, an optional insulating material could be used between the electrodes in 12 and 13 in addition to or instead of the material 14.

The electrochromic material mixed with the electrolyte in the active layer may be any known electrochromic material such as tungsten oxides, molybdenum oxides, niobium oxide, prussian blue, iridium and nickel oxides, viologens and their derivatives, as well as electrochromic polymers, including, polyanaline, polypyrrole, poly(isonapthalene), polythiophene, and rare-earth diphthalocyanine complexes.

The electrolyte material mixed with the electrochromic material to form the active layer may be any known conducting electrolyte such as aqueous, nonaqueous, and mixed aqueous-nonaqueous salts (i.e., a co-solvent). The co-solvent may be useful to enhance component solubility, modify conductivity, modify rheology of the composition, and modify adhesion to the surface of the electrode layer. Potentially useful co-solvents include, but are not limited to: alcohols such as isopropanol and ethanol, aldehydes, ketones, ethers, formamides, or common electrochemical solvents such as acetonitrile, N-methylpyrolidinone, and propylene carbonate. Co-solvents with high dielectric constants and high reduction potentials (i.e., low electroactivity and low protic activity such as propylene carbonate) are particularly preferred.

The electrochromic material and electrolyte may be mixed by any known method of mixing materials in the chemical arts.

The minimum required resistivity of an ionically conducting, electrically isolative active layer is about 1000 Ohms/cm. It is more preferred that the resistivity of the active layer be greater than 10,000 Ohms/cm. It is most preferred that the resistivity of the active layer be greater than 25,000 Ohms/cm. The resistivity of the active layer is preferably greater than twenty times, more preferably greater than fifty times, and most preferably one hundred times greater than one resistivity of the top transparent electrode.

Preferred active layers are described in a co-pending application having Ser. No. 10/102,236, which is expressly incorporated by reference herein. The composition may take the form of several embodiments.

In a first embodiment, the composition comprises (a) a non-aqueous compound that undergoes a reversible electron transfer reaction with a subsequent change in its protic state resulting in a pH gradient in the device, (b) at least one indicator dye, and (c) a charge transport material.

According to a second embodiment, the composition comprises component (a) a compound that undergoes an electron transfer reaction with a subsequent change in its protic state, (b) at least one indicator dye which changes color when a change in pH occurs, and (c) an ionically conductive material. The composition optionally further comprises component (d) a matrix material. Components (a), (b), (c), and (d) are different from one another. Component (a) preferentially undergoes an electron transfer reaction when a charge is applied to the composition. Additionally, if component (c) is a fluid, the composition further comprises the matrix material component (d). An opacifier component (e) and/or a secondary redox couple (f) are added in more preferred embodiments.

The first component (a) of the composition is any compound that undergoes a reversible redox (i.e. electron transfer) reaction, such that a pH change occurs in the region surrounding the compound, i.e., component (a) generates protons, hydroxide ions, or other components that cause a pH shift as a result of a redox reaction. Component (a) should preferentially undergoes the electron transfer or redox reaction in the cell. The term preferentially undergoes the electron transfer reaction means that the electron transfer or redox reaction primarily occurs on a particular component and/or its redox couple (if any) and redox reactions involving other components are insignificant. Preferably 70%, more preferably 80%, and most preferably more than 90% of the redox reactions occurring within the composition occur on component (a) and/or its redox couple. While some redox reactions may occur with some other components, such reactions with other components occur at a significantly lower rate, later in the life of a device and are considered side reactions. The reaction electron transfer or redox reaction should occur at the interface of component (a) with the electrode surface.

There are a number of ways to determine or approximate whether a component will preferentially undergo the redox reaction relative to the other components. In one embodiment, the standard reduction potential of component (a) should be less than for the other components in the device. Alternatively, the electrode potential, E, of component (a) is less than the electrode potential for the other components of identical sign in the half-cell reaction, as described by the Nernst equation. The Nernst equation links the actual reversible potential of an electrode, E, to the standard or idealized reduction potential, $E^0$, according to the following equation:

$$E=E^0-(RT/zF)\ln(a(RED)/a(OX)),$$

where R is the universal gas constant, T is the absolute temperature, z is the charge number of the reaction at the electrode surface, and F is the Faraday constant. The notation a(RED) represents the chemical activities of all reduced species at the cathodic electrode surface, while a(OX) represents the chemical activities of all oxidized species at the anodic electrode surface. If component (b) does not participate in the redox reaction at the counter electrode under the applied voltage conditions (i.e. E(species)<E(applied)), the secondary redox couple, component (f), may be added to complement component (a), serving as the secondary half-cell reaction. If component (b) is irreversible or quasi-reversible, component (f) may be added to prevent component (b) from participating in the half-cell reaction. Therefore, it is preferred that the electrode potential of component (f) be closer to zero than that of component (b), assuming they are of the same sign. If component (b) is the same sign as component (a), it is preferred that the electrode potential of species component (a) be closer to zero than that of component (b).

Another method of determining which component will preferentially undergo the electron transfer reaction can be depicted by CV cyclability curves for each electroactive component. Measured (as opposed to calculated) values of the oxidative and reductive peaks of the individual components, as well as repeated cyclability (i.e. change in current versus number of cycles) serve as a simple means to define reaction preference at each electrode surface, as well as determine the electrochemical stability of the entire system, respectively. Electrochemical stabilization of the indicator dye is important when the dye undergoes irreversible or quasi-reversible redox reaction.

Examples of compounds suitable for use as the first component (a) may include but are not limited to any number of organic or inorganic redox reagents, including but not limited to: iodates, bromates, sulfates, metal hydroxides, phosphates, ketones, aldehydes, quinones, quinolines, sulfur compounds, hydroxybenzenes, carboxylic acids, polyoxometallates, and amines. Materials such as hydroquinone and other quinone derivatives such as methylquinone and duroquinone, which are highly reversible, do not undergo many side reactions, and have a relatively low standard reduction potential are particularly preferred. Component (a) is preferably present in amounts of greater than 0.01 percent, more preferably greater than 0.1 percent based on total weight of the composition. Component (a) is preferably present in amounts less than about 15 percent, more preferably less than about 10 percent, based on total weight of the composition. All percentages herein are weight percents based on total weight of the composition, unless explicitly indicated otherwise.

In addition to component (a), component (f) is preferably added as a secondary redox couple, which would undergo complimentary redox reaction. A complimentary redox reaction is defined as the material which undergoes the second half of the redox reaction (i.e. one of the preferential half reactions at the electrode surface). Furthermore, component (f) should be reversible (electrochemically) and chemically stable in the system. Examples of compounds suitable for use as the secondary redox couple (f) may include but are not limited to any number of organic or inorganic redox reagents, including but not limited to: iodates, bromates, sulfates, metal hydroxides, phosphates, ketones, aldehydes, quinones, quinolines, sulfur compounds, hydroxybenzenes, carboxylic acids, polyoxometallates, and amines. Materials such as hydroquinone and other quinone derivatives such as methylquinone and duroquinone, which are highly reversible, do not undergo many side reactions, and have a relatively low standard reduction potential are particularly preferred. When used, component (f) should be present concentration ranges equal to those used in component (a) and at ratios optimized for the individual cell (i.e. electrochemical system). Thus, component (f) is preferably present in amounts of greater than 0.01 percent, more preferably greater than 0.1 percent based on total weight of the composition. Component (f) is preferably present in amounts less than about 15 percent, more preferably less than about 10 percent, based on total weight of the composition. All percentages herein are weight percents based on total weight of the composition, unless explicitly indicated otherwise.

The second component (b) in the composition is an indicator dye that changes color when a change in pH occurs. Any known pH indicator dyes or their derivatives could be used. A single indicator dye may be used or they may be used in combination to give a variety of colors. The response and chromaticity of various dyes can be optimized by changing the starting pH of the system and/or the proton or hydroxide generator. Non-limiting examples of suitable indicator dyes include phenylthalein, bromocrescol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, bromothymol blue, etc. Dyes that yield more than two different colors, depending on pH, are of particular interest as they would enable multi-color images with use of a single dye. Thymol blue is one example of such a dye—it is yellow under neutral conditions, red under acidic conditions, and blue under basic conditions. Dyes that are very pale or transparent in one form are also desirable as they may allow more flexibility in color selection in the display. Finally, indicator dyes, which change colors at varying pH levels and are of varying colors, may be combined to tailor the colors in the display to the users desire or to attain multi-color or possibly full color displays. The indicator dye is preferably present in amounts of at least 0.01 percent, more preferably 0.1 percent by weight. The dye is preferably used in amounts less than 15 weight percent, more preferably less than 5 weight percent. When combinations of dyes are used, the total amount of dye in the composition should preferably be less than 15 percent. Other non pH sensitive dyes or pigments may be used to alter the aesthetics of the display as well, as long as the materials do not parasitically alter the redox chemistry, such that the system can no longer meet the application requirements.

Component (c) is a charge, (i.e., ion) transport material. This material may be any known material that is capable of transporting the necessary ions from the redox material to the indicator dye. However, component (c) itself does not substantially undergo a redox reaction. Examples of materials which can be used as component (c) include aqueous solutions, protic solvents, and solid electrolytes. The aqueous solutions preferably comprise electrolyte concentrations of greater than or equal to 0.01 percent and less than or equal to 50 percent and more preferably less than or equal to 0.5 percent based on weight of the solution. Suitable electrolyte components include salts, such as, for example, sodium, lithium, magnesium, or calcium sulfate, perchlorate or chloride, as well as organic ionic materials, such as amines and organic acid electrolytes. Non-chloride electrolytes are preferred because chloride is fairly reactive with metal electrode surfaces. The presence of a high concentration of other ions utilizes the common ion effect to reduce the neutralization driving force of the protons and hydroxide ions, thus enhancing open circuit lifetime. Optionally, the electrolyte solution would contain one or more buffer components, depending on the operating pH range of the system. A buffer is defined as a material that resists changes in pH, as a result of the addition of small amounts of acids or bases. By adding the appropriate pH buffer(s) to component (c), lifetimes may be enhanced by avoiding pH extremes at the electrodes, as previously described. Examples of buffer components include, but are not limited to: weak acids such as carboxylic acids (formate, acetate, citrate, fumaric, glycolic, oxalic, etc.), weak bases such as amines (ethylenediamine, triethylamine, etc.), or zwitterionic materials such as amino acids or biological buffers (CAPS, MES, MOPS, TAPSO, or AMPSO). In addition, components a, b, c, d, e, or f may also serve as one or more of the buffer components in the system. However, in order to optimize the response time of the system, it is preferred that none of the materials of construction buffer in the color transition range of component B. For example, component C containing a phosphate buffer, which buffers at a pH of 2.5 and 7.5, would be suitable for use with bromocresol purple, which has a color transition around 5.5. Preferably, the buffer should not negatively participate in the redox reaction.

The aqueous solution may also comprise a co-solvent. The co-solvent may be useful to enhance component solubility, modify conductivity, modify rheology of the composition and modify adhesion to the surface of the electrode layer. Potentially useful co-solvents include, but are not limited to: alcohols such as isopropanol and ethanol, aldehydes, ketones, ethers, formamides, or common electrochemical solvents such as acetonitrile, N-methylpyrolidinone, and propylene carbonate. Co-solvents with high dielectric constants and high reduction potentials (i.e., low electroactivity and low protic activity such as propylene carbonate) are particularly preferred.

A nonaqueous system could be used as component (c), provided the redox component can cause an adequate pH shift and there is adequate polarity to provide good ionic conductivity. Suitable protic solvents that could be used in a non-aqueous system include, but are not limited to: propylene carbonate, dimethyl formamide, formamide, N-methyl pyrrolidinone, acetonitrile, dimethylsulfozide, alcohols (methanol, isopropanol, ethanol, etc.), pyridine, and 1,4-dioxane. In addition, a low molecular weight glycol ether such as ethylene glycol, propylene glycol, polyethylene glycol, or a derivative therefore may be used. Nonaqueous systems are preferred when electrode corrosion, evaporative water loss, and water electrolysis become an issue. Mixed, immiscible solvents or materials, such as aqueous/organic or polymeric dispersions or microencapsulated aqueous systems may also be used to prevent contact between a corrosive aqueous electrolyte and the electrode surface. Additionally, low proton content allows the application of a greater drawing voltage (without significant system hysteresis) which speeds up kinetics.

The amount of ion/charge transport material in the system may depend upon the efficiency of the material in transporting charge and/or ions, as well as the relative amounts of additional additives (such as components (d) and (e)) that are desired. However, the amount is preferably at least 5, more preferably at least 10, and most preferably at least 20 weight percent and is less than 99.98 weight percent, more preferably less than 90 weight percent and most preferably less than 70 weight percent.

Preferably, embodiments of the composition also comprise (d) a matrix material. The matrix material may provide structural integrity to the device. This will aid printability and processability. In addition, or alternatively, the matrix material may be used to control ion transport, and diffusion rate of the other materials in the composition. Limiting ion transport and diffusion of components in the longitudinal direction increases resolution and stability over time of the image formed. Limiting ion transport and diffusion in all directions increases open circuit lifetime and optical density. Thus, according to one embodiment, the matrix material may comprise a skeletal, porous or framework structure that is saturated with the other components of the composition. For example, an open cell polymeric foam, a honeycomb structure, a screen, a mesh, spacer particles or paper may be saturated with the other components or have the other components absorbed into the open regions of the structure. Naturally and synthetically occurring polymers are particularly suitable for supplying such skeletal or porous structures. Alternatively, or in addition to a skeletal matrix material, viscosity modifier or diffusion inhibitor may be blended directly with components (a), (b), and (c). This material preferably provides consistency to the composition, as is found in a gel or a paste. Polymers and other viscosity modifiers are particularly preferred. Multiple matrix materials may also be added. For example, fumed silica is known to disrupt the crystalinity of glycol ethers, thus increasing the conductivity of the system while maintaining good structural integrity. Precise choice of such a matrix material will depend upon compatibility with the solution or solvents that are chosen. Nanocrystalline particles or sol gel systems may also be added as well to optimize the Theological properties of the system while maintaining the required transport properties. Examples of matrix materials include silicates such as silicon dioxide, aluminates, or zirconium oxide, barium titanate, and other particles or polymeric materials such as, hydroxyethyl cellulose, polyethylene glycols, polyethylene oxides, polyurethanes, polyacrylates, polysulfonic acids, polyacetates, latexes, styrene divinylbenzene polymers, and polypropylenes. The matrix material is preferably present in amounts of 1 to 90 percent and more preferably 10 to 90 percent by weight. The matrix material may either be blended or polymerized/cured in-situ (i.e., photopolymerized or thermally polymerized) from its monomer. As the monomer is not polymerized, the viscosity of the material will be more like that of water, allowing the material to be easily filled into a cell or incorporated into a foam or paper, as opposed to being applied as a paste.

The matrix material may optionally contain weak acid and/or weak base end-groups, which serve to buffer the pH of the system as well. In addition, the matrix material may provide opacity to the composition. Such opacity is desirable as the electrochromic process is a surface phenomenon (occurring at the interface of the electrode and the composition). With an opaque composition providing reflection near the surface of the cell, only the first few microns at the surface must be dyed in order to see the color change. This reduces the amount of time required to generate a color change allowing switching times much faster than traditional electrochromic window displays. Optionally, in addition or instead of a matrix material, an opacifying agent (e) may be used. Suitable opacifiers include particles, such as $TiO_2$, latexes, barium titanate, and other particles. Component (e), when used, is preferably present in amount equal to or greater than 0.1 percent and more preferably greater than or equal to 1.0 percent. Component (e) is preferably present in an amount less than or equal to 75 percent by weight and more preferably less than or equal to 40 percent by weight. Component (e) may be the same as component (d). They may be the same material or materials providing a dual function of matrix and opacifier.

The architecture, as described here, could potentially be useful for large area devices. Large area electrochromic devices have traditionally been difficult to achieve it is hard to provide enough current across a large area of a transparent metal oxide such as ITO. In this architecture, round pixels with an outer "dummy" or "activating" electrode could surround a larger inner electrode. The outer electrode could serve only to activate the large inner electrode. In this format, the current must flow only the small distance from the outer, activating electrode to the nearby inner or viewable electrode or pixel. The outer electrode could be masked so that it is not viewable. Multiple pixels could be multiplexed in a direct drive format to create a large area updateable device. In another format, a blanket coat of silver and/or graphite conductive ink could be placed across the entire sheet except for a small gap between the ink and the interior active electrode. A number of similar type architectures could also be envisioned.

The devices are easily assembled using known processes. For example, an electrode may be applied to a substrate using known methods, such as vapor deposition, electroplating, etc. The electrodes may be patterned as desired by photolithography, etching, application using a mask, etc. The active layer, if in the form of a film, may then be laminated to the substrate bearing the electrode. If the composition is a fluid or paste, it could be coated by known methods, such as blade coating, stenciling, spin coating, etc., or could be applied as a pattern via conventional drum printing, screen printing or ink jet printing. Alternatively, the composition could be applied to a carrier substrate with an optional release film on the opposite side of the composition. The release film could be removed prior to adhering the composition to a permanent substrate comprising an electrode or pattern of electrodes.

Screen printing or stencil printing are desirable assembly methods because they involve a minimum amount of assembly steps. High viscosity electrochromatic inks of this invention can be efficiently screen or stencil printed if viscosity is controlled.

Screen printing or stencil printing electrochromic inks including preferably the compositions of this invention, can be done in several steps. The steps begin with providing an electrochromic ink preferably containing ionic species. A secondary competitive binder is then added and mixed with the electrochromic ink. Next, a gel-forming polymer in which the electrochromic ink is insoluble at room temperature is then added and mixed with the mixture of the electrochromic ink and the secondary competitive binder. That mixture is then screen printed or stencil printed onto a substrate which is heated at a temperature sufficient to cause the mixture to gel. Without wishing to be bound, applicants believe heat causes the gel-forming polymer to unwind and hydrogen bond with itself and the secondary competitive binder.

A preferred embodiment of this method comprises several steps. The first step is to dissolve an ionic electrochromic ink in a non-aqueous solvent. The next step is adding and mixing a polymer containing non-ionic viscosity modifying polymer having a number average molecular weight greater than about 20,000, preferably in the range of about 50,000 to about 100,000 from the group consisting of polyethylene oxide, polyethylene glycol, polypropylene oxide, polyvinyl alcohol, polyvinyl acetate, polyacrylamides, poly(vinyl pyrrolidone), polysaccharides, cellulose derivatives, methacrylic polymers, or poly(2-ethyl-2-oxaoline) into the mix. As a third step a low molecular weight polymer having a number average molecular weight from about 200 to about 600 from the same group of polymers as listed in step 2, is then added to the resulting mixture and mixed with it. Finally, a compound of molecular viscosity average molecular weight from about 300,000 to about 8,000,000 again selected from the group of polymers of Step 2 is added and mixed. The mixture is then applied to a substrate. The substrate is then heated at between 70 to 100 degrees C. for one to 10 minutes gelling the material resulting in a thickened, non-flowable electrochromic paste. Finally, a substrate is applied to the gelled material/substrate completing the cell.

Lower molecular weight polymer is added to prevent the gel forming polymer from gelling immediately upon addition to the electrochromic ink. These lower molecular weight materials act as secondary competitive binders. They complex with the available dye, salt, and electroactive species within the system. Thus, through the proper order of addition of species and the proper ratios of the polymers to the complexing species within the system gelation of the electrochromic material is controlled using heat. Polyethylene Glycol is the preferred low molecular weight species. Polyethylene oxide is the preferred intermediate and high molecular weight species.

Examples of materials which can be used as ionic species include sodium chloride, lithium magnesium chloride, or calcium sulfate, percholorate or chloride, as well as organic ionic materials, such as organic ammonium, carboxylic acid, and sulfonic acid salts. The preferred ionic species mass loading ranges from 1 to 10 percent by weight with sodium sulfate being the preferred ionic species.

EXAMPLES

Example 1

A side-by-side or in-plane electrode structure was made by scoring a cured piece of 50 Ohm per square conductive Electrodag 423SS graphite ink from Acheson Colloids, Port Huron, Mich. cured for 180 seconds at 70 C. on a PET plastic substrate. A line was scored as above to create two 1 cm lines. The active material containing the ingredients described below were mixed. The bulk conductivity of the material was measured to be 41,667 Ohms-cm. The material was manually spread across the surface of the substrate. The thickness was set using a 10 mil or 250 micron gasket, and top was covered with a 100 Ohm per square ITO-PET film. By applying 3V potential between the two in-plane carbon electrodes, a reversible, high-contrast image could be formed at the ITO surface just above one electrode without applying any voltage directly to the ITO substrate (i.e. the adjacent pixel is used to drive the other). When the leads were reversed, coloration occurred at the ITO-active material interface just above the other electrode. The image took less than 1 second to form, indicating that the vast majority of current flow was through the ITO top surface. Since the READ material is very high resistance, the current flow takes the path of least resistance and flows through the material and across the ITO surface and to the other electrode. This will work as long as R(active layer)>R (transparent electrode) and the thickness of the gap is less than the distance to travel between the two electrodes.

| Recipe for Active Material: | |
|---|---|
| Batch Size, gms | 375 |
| gms of ingredient | |
| Phenol Red | 13.2 |
| Hydroquinone | 26.9 |
| Titanium dioxide | 200.7 |
| Sodium Sulfate | 26.9 |
| Propylene Carbonate | 80.3 |
| Polyethylene oxide, 100 K | 26.9 |

Note:
The resistivity/conductivity measurements were taken with a Corning Checkmate II Conductivity/TDS handheld meter with automatic temperature correction (TDS-total dissolved solids). The meter was first calibrated (2 points with standard conductivity/TDS solutions). The conductivity for the active material was measured by submerging the sensor probe in the material and waiting approximately 30–45 seconds for a final reading. The probe was then washed and dried before making an additional measurement.

Example 2

An identical experiment to Experiment 1 was performed, only 300 Ohm per square Poly-3,4-Ethylenedioxythiophene (PEDOT) was used as the top transparent substrate. An image was generated in less than 1 second; indicating that the vast majority of the current flow was still through the ITO top substrate. However, it was noted that the contrast was slightly lower than with ITO (probably due to the reduced transparency of the PEDOT versus ITO).

Example 3

An identical experiment to Experiment 1 was performed, only 2,600 Ohm per square Poly-3,4-Ethylenedioxythiophene (PEDOT) was used as the top transparent substrate. An image was generated; however, the contrast was significantly lower than with ITO or 300 Ohm per square PEDOT and the image took about 5 seconds to form, indicating that the current flow through the ITO top substrate was significantly reduced. As a practical matter, it will be difficult to use materials that have resistivities less than 10,000 Ohms per cm in these PEDOT systems. Resistivities even higher (i.e. greater than 25,000 Ohms per cm) would be preferred.

What is claimed is:

1. A display device comprising a solid transparent charge conducting material, positioned below the transparent material an active layer comprising an electrochromic material and an electrolyte; and positioned below the active layer a working electrode and a counter-electrode arranged to be isolated from one another wherein the distance between the working electrode and the counter-electrode is greater than two times the thickness of the active layer between the electrode and the transparent conductive material.

2. The device of claim 1 wherein the working electrode and the counter electrode are arranged side-by-side in the same plane.

3. The device of claim 1 wherein the total resistance of the active layer is greater than 1,000 Ohms per centimeter.

4. The device of claim 1 wherein the total resistance of the active layer is greater than 10,000 Ohms per centimeter.

5. The device of claim 1 wherein the total resistance of the active layer is greater than 25,000 Ohms per centimeter.

6. The device of claim 1 wherein the resistance of the active layer is greater than twenty times the resistance of the top transparent material.

7. The device of claim 1 wherein the resistance of the active layer is greater than fifty times the resistance of the top transparent material.

8. The device of claim 1 wherein the resistance of the active layer is greater than one hundred times the resistance of the top transparent substrate.

9. The device of claim 1 wherein the active layer is continuously present across the working electrode and the counter electrode.

10. The device of claim 1 wherein an insulator is present between the working electrode and the counter electrode.

11. A display device comprising a transparent charge conducting material, positioned below the top transparent material, an active layer comprising (a) a non-aqueous compound that undergoes an electron transfer reaction with a subsequent change in its protic state resulting in a pH gradient in the device, (b) at least one indicator dye, and (c) a charge transport material; and positioned below the active layer a working electrode and a counter electrode arranged to be isolated from one another wherein the distance between the working electrode and the counter electrode is two times the thickness of the active layer between the electrode and the transparent conductive material.

12. The device of claim 11 wherein the working electrode and the counter electrode are arranged side-by-side in the same plane.

13. The device of claim 12 wherein an insulator is present between the working electrode and the counter electrode.

14. A display device comprising a top transparent layer charge conducting material, positioned below the top transparent material an active layer comprising
   (a) a compound that undergoes an electron transfer reaction with subsequent change in its protic state
   (b) at least one indicator dye which changes color when a change in pH occurs, and
   (c) an ionically conductive material
and optionally component (d), a matrix material, wherein components (a), (b), (c), and (d) are different from one another and component (a) preferentially undergoes the electron transfer reaction when a charge is applied to the composition and positioned below the active layer a working electrode and a counter-electrode arranged to be isolated from one another wherein the distance between the working electrode and the counter electrode is greater than two times the thickness of the active layer between the electrode and the transparent conductive material.

15. The device of claim 14 characterized in that the active layer further comprises component (a) is present in an amount from 0.01 to 15 weight percent, component (b) is present in an amount from 0.01 to 15 weight percent, component (c) is present in an amount from 5 to 99.98 weight percent, component (d) is present in an amount from 0 to 90 weight percent, an opacifier component (e) is present in an amount from 0 to 75 weight percent based on total weight of the composition and component (f) a secondary redox couple present in an amount of 0 to 15 weight percent.

16. The device of claim 14 wherein component (a) is selected from the group consisting of iodates, bromates, sulfates, metal hydroxides, phosphates, ketones, aldehydes, quinones, quinolines, sulfur compounds, hydroxybenzenes, carboxylic acids, and amines.

17. The device of claim 14 wherein component (b) comprises one or more indicator dyes selected from but not limited to the group consisting of phenylthalein, bromocresol purple, phenol red, ethyl red, quinaldine red, thymolthalein, thymol blue, malachite green, crystal violet, methyl violet 2B, xylenol blue, cresol red, phyloxine B, congo red, methyl orange, bromochlorophenol blue, alizarin red, chlorophenol red, 4-nitrophenol, nile blue A, aniline blue, indigo carmine, and bromothymol blue.

18. The composition of claim 14 wherein the matrix (d) comprises a polymer or other viscosity modifier and the matrix is blended with the other components of the composition.

19. The composition of claim 14 wherein component (e) one opacifier is selected from the group consisting of titanium dioxide, latexes, and barium titanate.

20. The device of claim 14 wherein the top transparent charge conducting material is selected from the group consisting of indium tin oxide, tin oxide, antimony tin oxide, gold, chrome, platinum, poly(3,4-ethylenedioxythiophene), polyaniline, polythiophene, polypyrrole, and polyphenylenevinylene.

21. The device of claim 14 wherein the working electrode and the counter electrode are arranged side-by-side in the same plane.

22. The device of claim 14 wherein an insulator is present between the working electrode and the counter electrode.

* * * * *